(12) United States Patent
Stuart et al.

(10) Patent No.: US 7,811,065 B2
(45) Date of Patent: Oct. 12, 2010

(54) VACUUM PUMP FOR DIFFERENTIAL PUMPING MULTIPLE CHAMBERS

(75) Inventors: Martin Nicholas Stuart, Shoreham-By-Sea (GB); David John Goodwin, Crawley (GB); Ian Olsen, Crawley (GB)

(73) Assignee: Edwards Limited, Crawley, West Sussex (GB)

( * ) Notice: Subject to any disclaimer, the term of this patent is extended or adjusted under 35 U.S.C. 154(b) by 960 days.

(21) Appl. No.: 11/630,729

(22) PCT Filed: Jun. 9, 2005

(86) PCT No.: PCT/GB2005/002249

§ 371 (c)(1),
(2), (4) Date: Dec. 21, 2006

(87) PCT Pub. No.: WO2006/000745

PCT Pub. Date: Jan. 5, 2006

(65) Prior Publication Data

US 2008/0166219 A1    Jul. 10, 2008

(30) Foreign Application Priority Data

Jun. 25, 2004  (GB) .................... 0414316.0

(51) Int. Cl.
*F04B 25/00* (2006.01)
*F04D 31/00* (2006.01)
*F04D 1/06* (2006.01)

(52) U.S. Cl. .................... 417/250; 417/423.4; 415/116; 415/143

(58) Field of Classification Search ............. 417/250, 417/266, 423.4; 62/55; 415/116, 143
See application file for complete search history.

(56) References Cited

U.S. PATENT DOCUMENTS 5,162,650 A    11/1992  Bier (Continued)

FOREIGN PATENT DOCUMENTS

EP    1 085 214 A2    3/2001

(Continued)

OTHER PUBLICATIONS

Ralf Adamietz, Guenter Schuetz, Christian Beyer; abstract of EP 1422423 A1; "Apparatus with Evacuatable Chamber," dated May 26, 2004; Leybold Vakuum GmbH.

(Continued)

*Primary Examiner*—Charles G Freay

(57) ABSTRACT

A differentially pumped mass spectrometer system comprises a mass spectrometer having first and second pressure chambers through which, during use, ions are conveyed along a path. A pump assembly (10) for differentially evacuating the chambers (62, 66, 68) is attached to the mass spectrometer. The pump assembly comprises a housing (12) attached to the mass spectrometer and a cartridge (14) inserted into the housing. The cartridge has a plurality of inlets (16, 18, 20) each for receiving fluid from a respective pressure chamber (62, 68, 66) and a pumping mechanism (30, 32, 34) for differentially pumping fluid from the chambers. The cartridge is inserted into the housing such that the pumping mechanism (10) is inclined relative to the ion path (76), but with the cartridge protruding into the mass spectrometer to such an extent that at least one of the inlets (16, 18) at least partially protrudes into its respective chamber (62, 68) without crossing the ion path.

29 Claims, 6 Drawing Sheets

U.S. PATENT DOCUMENTS

| | | | |
|---|---|---|---|
| 5,661,229 A | | 8/1997 | Bohm et al. |
| 5,733,104 A | * | 3/1998 | Conrad et al. ............. 417/44.1 |
| 6,435,811 B1 | | 8/2002 | Beyer et al. |
| 6,457,954 B1 | | 10/2002 | Adamietz et al. |
| 6,709,228 B2 | * | 3/2004 | Stuart .......................... 415/90 |
| 2001/0018018 A1 | | 8/2001 | Conrad et al. |
| 2002/0100313 A1 | | 8/2002 | Abbel |

FOREIGN PATENT DOCUMENTS

| | | |
|---|---|---|
| EP | 1 085 214 B1 | 5/2003 |
| EP | 1 422 423 A1 | 5/2004 |
| GB | 2 360 066 A | 9/2001 |

OTHER PUBLICATIONS

United Kingdom Search Report of Application No. GB 0414316.0 dated Oct. 29, 2004; Claims searched: 1-21; Date of search: Oct. 28, 2004.

United Kingdom Search Report of Application No. GB 0414316.0 dated Nov. 12, 2004; Claims searched: 22-29; Date of search: Nov. 11, 2004.

PCT Invitation to Pay Additional Fees of International Application No. PCT/GB2005/002249; Date of mailing: Aug. 16, 2005.

PCT Notification of Transmittal of the International Search Report and the Written Opinion of the International Searching Authority, or the Declaration of International Application No. PCT/GB2005/002249; Date of mailing: Sep. 20, 2005.

PCT International Search Report of International Application No. PCT/GB2005/002249; Date of mailing of the International Search Report: Sep. 20, 2005.

PCT Written Opinion of the International Searching Authority of International Application No. PCT/GB2005/002249; Date of mailing: Sep. 20, 2005.

* cited by examiner

VACUUM PUMP FOR DIFFERENTIAL PUMPING MULTIPLE CHAMBERS

FIELD OF THE INVENTION

This invention relates to a vacuum pump, and in particular to a vacuum pump with multiple inlets suitable for differential pumping of multiple chambers.

BACKGROUND OF THE INVENTION

There are a number of types of apparatus where a plurality of chambers or systems need to be evacuated down to different levels of vacuum. For example, in well known types of mass spectrometer, the analyser/detector has to be operated at a relatively high vacuum, for example $10^{-5}$ mbar, whereas a transfer chamber, through which ions drawn and guided from an ion source are conveyed towards the detector, is operated at a lower vacuum, for example $10^{-3}$ mbar. The mass spectrometer may comprise one or more further chambers upstream from the analyser chamber, which are operated at progressively higher pressures to enable ions generated in an atmospheric source to be captured and eventually guided towards the detector.

Whilst these chambers may be evacuated using separate turbo-molecular vacuum pumps, each backed by a separate, or common backing pump, for example a rotary vane pump, it is becoming increasingly common to evacuate two or more adjacent chambers using a single, "split flow" turbo-molecular pump having a plurality of inlets each for receiving fluid from respective chamber, and a plurality of pumping stages for differentially evacuating the chambers. Utilising such a pump offers advantages in size, cost, and component rationalisation.

For example, EP-A 0 919 726 describes a split flow pump comprising a plurality of vacuum stages and having a first pump inlet through which gas can pass through all the pump stages and a second inlet through which gas can enter the pump at an inter-stage location and pass only through a subsequent stage of the pump. The pump stages prior to the inter-stage location are sized differently from those stages subsequent to the inter-stage location to meet the pressure requirements of the different chambers attached to the first and the second inlets respectively.

However, when mounted to a mass spectrometer in a conventional manner, for example with the axis of the pump, or more particularly, its shaft axis, either parallel to or perpendicular to the plane of the outlet flanges of the mass spectrometer, conductance limitations of such a split flow pump compromise performance in comparison to an arrangement where adjacent chambers are evacuated using a bespoke vacuum pump directly mounted on to the respective chamber.

For example, when the pump is orientated with respect to the mass spectrometer such that the shaft axis is parallel to the plane of the outlet flanges, then gas must flow around a right angle bend to enter the pump inlet, which results in a pressure drop and associated loss of pumping speed. When the vacuum pump is orientated with its shaft axis perpendicular to the plane of the inlet of the outlet flange, whilst gas may flow easily into the first inlet, gas must flow around two bends in order to enter the second pump inlet.

In EP-A 1 085 214, these problems are reduced by mounting the split flow pump to the bottom of the mass spectrometer such that the shaft axis is inclined at an angle to the plane of the outlet flanges. With this orientation, the gas flows into the inlets by flowing around bends of obtuse angle so that there is little pressure drop between the outlet flanges and the pumping inlets. However, with such an arrangement the overall volume occupied by the mass spectrometer and split flow pump is increased in comparison to an arrangement where the shaft axis is parallel to the outlet flanges.

It is an aim of at least the preferred embodiment of the present invention to seek to provide an improved arrangement for the differential evacuation of a multi-chambered system, such as a mass spectrometer.

SUMMARY OF THE INVENTION

In a first aspect, the present invention provides a system comprising a plurality of pressure chambers and a vacuum pump for differentially evacuating the chambers, the pump comprising a plurality of inlets each for receiving fluid from a respective pressure chamber and a pumping mechanism for differentially pumping fluid from the chambers, wherein the pump protrudes through an opening into the chambers such that at least one of the fluid inlets is at least partially located within its respective pressure chamber, and the longitudinal axis of the pump is inclined to the plane of the mouth of the opening.

With such an orientation of the pump relative to the pressure chambers, the conductance of the inlets of the pump can be maximised and high effective pumping speeds can be achieved for a given pumping mechanism. Furthermore, since the pump protrudes into the chambers, the overall volume occupied by the chambers and pump is minimised.

The use of the invention is particularly advantageous where the system under evacuation is a mass spectrometer system, as the inclination of the pump allows the pump to be inserted into the chambers without the pump crossing the path of the ions conveyed within the mass spectrometer. Therefore, in a second aspect, the present invention provides a differentially pumped mass spectrometer system comprising a mass spectrometer having a plurality of pressure chambers through which, during use, ions are conveyed along a path; and a pump for differentially evacuating the chambers, the pump comprising a plurality of inlets each for receiving fluid from a respective pressure chamber and a pumping mechanism for differentially pumping fluid from the chambers, wherein the pump is inclined relative to at least part of the ion path and protrudes into the spectrometer without crossing the ion path but with at least one, preferably each, of the fluid inlets at least partially located within its respective pressure chamber.

The pump is preferably in the form of a cartridge inserted into a housing attached to or part of the mass spectrometer such that the cartridge protrudes through a mouth of the housing into said at least one of the chambers. This can provide a relatively simple construction for mounting and aligning the pump relative to the chambers under evacuation, as opposed to an arrangement wherein the pump is integrated into the body of the mass spectrometer.

As the pump may be provided in isolation from the mass spectrometer, a third aspect of the present invention provides a pump comprising a housing, a cartridge insertable into the housing, the cartridge comprising a fluid inlet and a pumping mechanism, and means for locating the cartridge within the housing such that a part of the cartridge defining the fluid inlet protrudes from a mouth of the housing, and such that the longitudinal axis of the pumping mechanism is inclined relative to the plane of the mouth.

BRIEF DESCRIPTION OF THE DRAWINGS

Preferred features of the present invention will now be described, by way of example only, with reference to the accompanying drawings, in which.

DETAILED DESCRIPTION OF THE INVENTION

Figure 1:
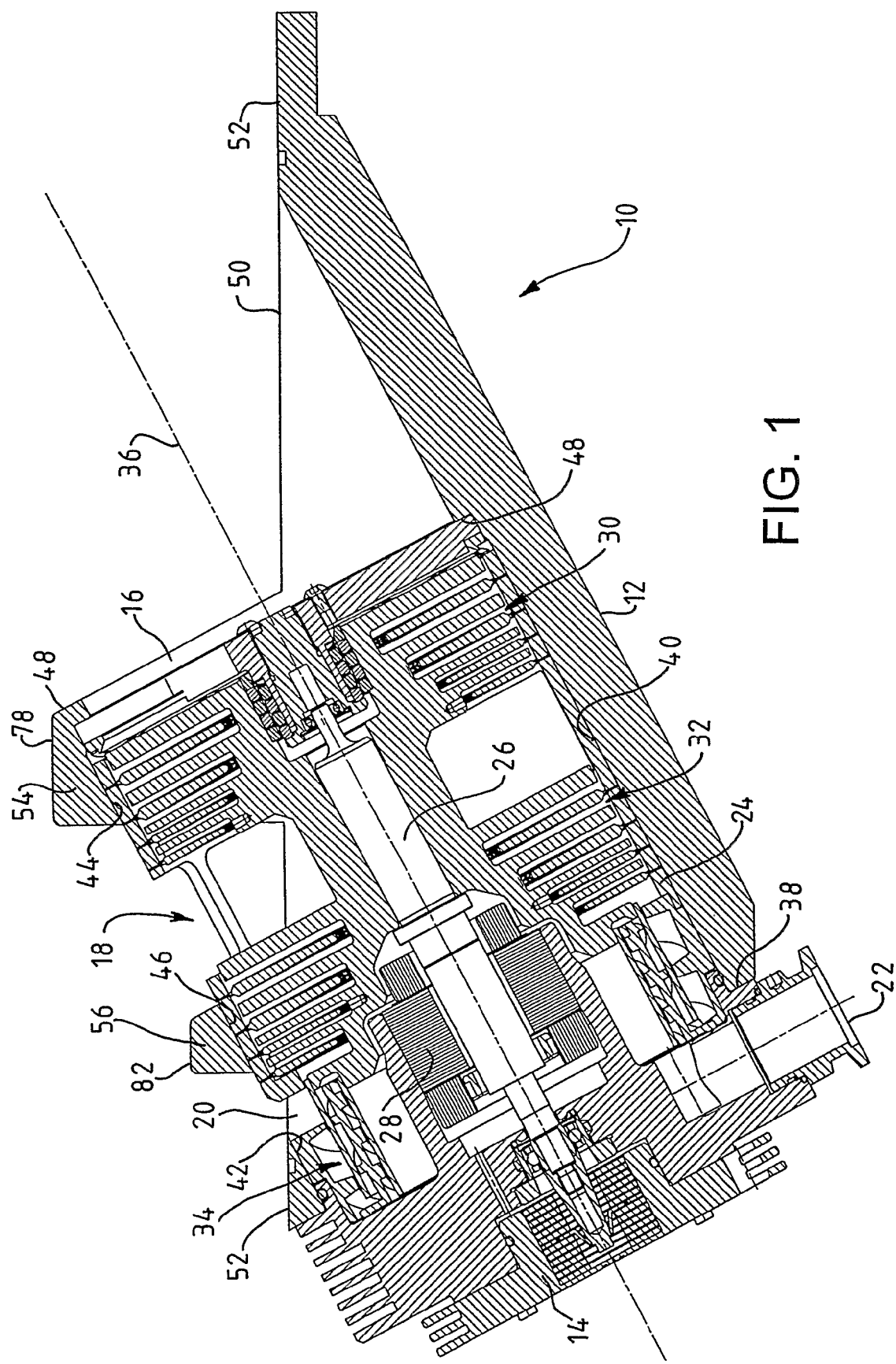
FIG. 1 is a vertical cross-section through a vacuum pump.
Figure 2:
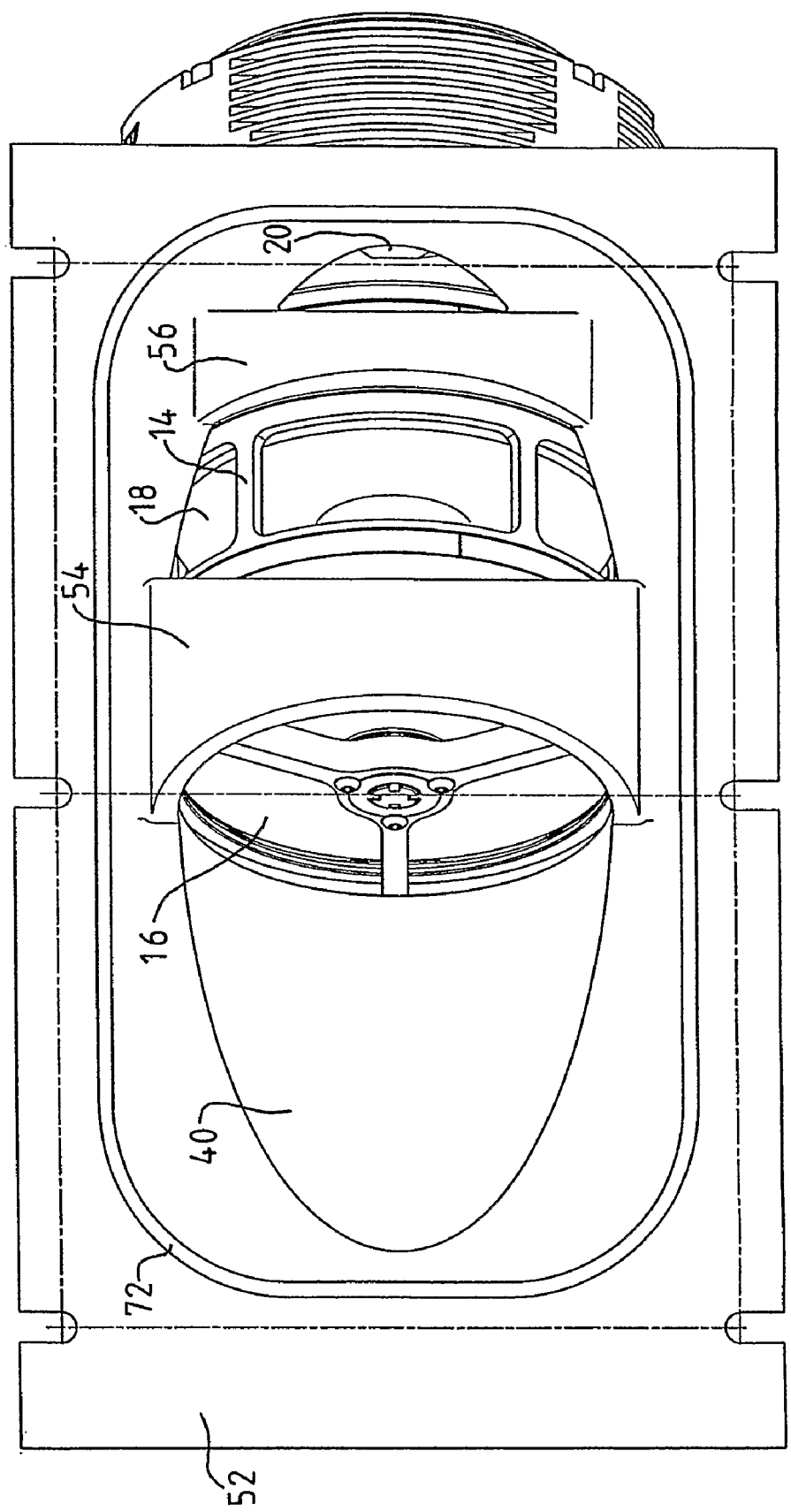
FIGS. 2 to 6 are various different external views of the pump.
Figure 3:
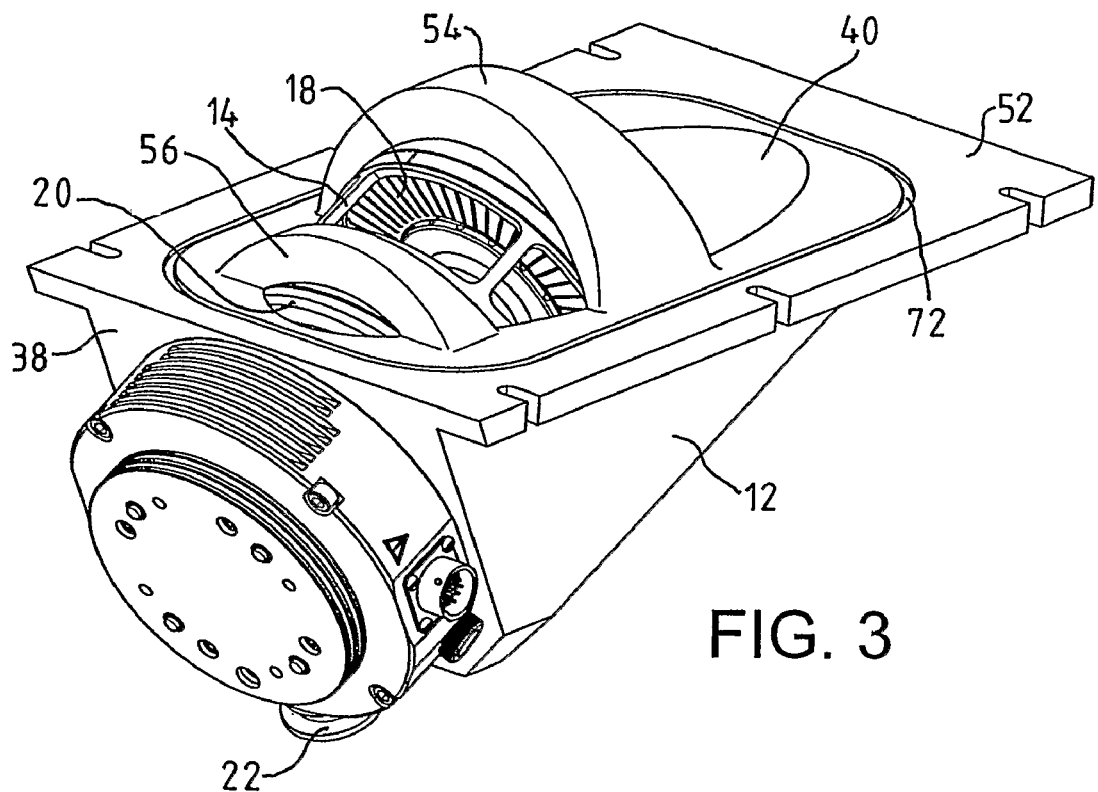
Figure 4:
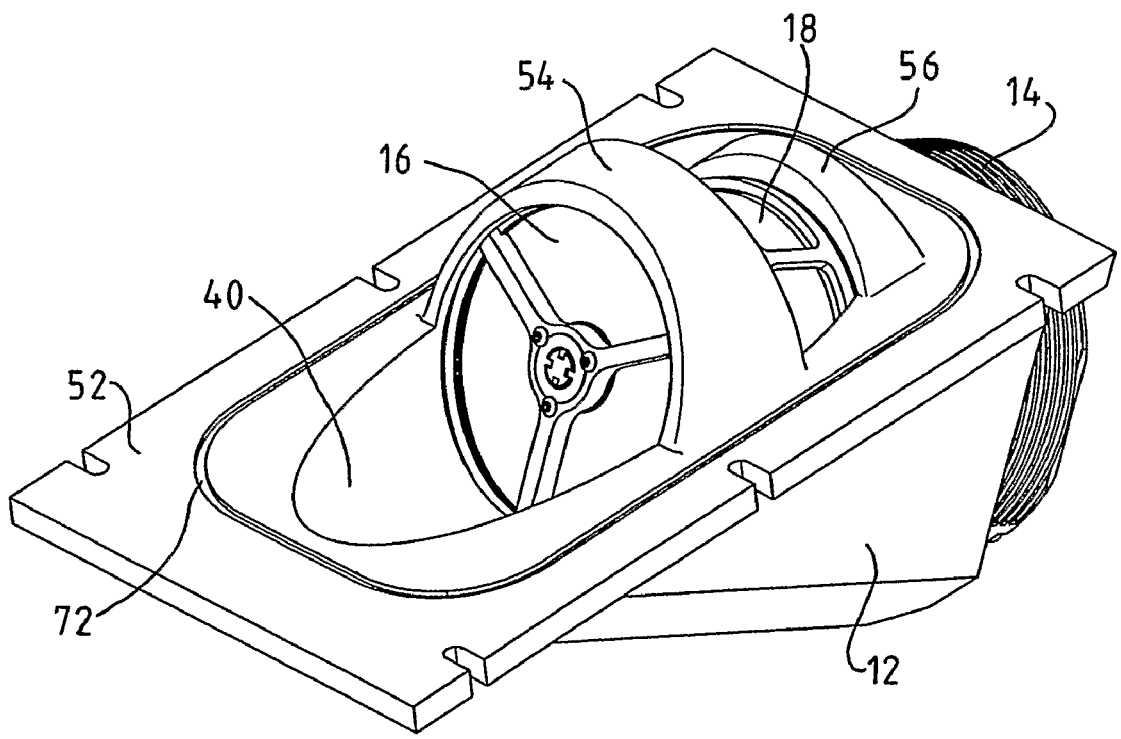
Figure 5:
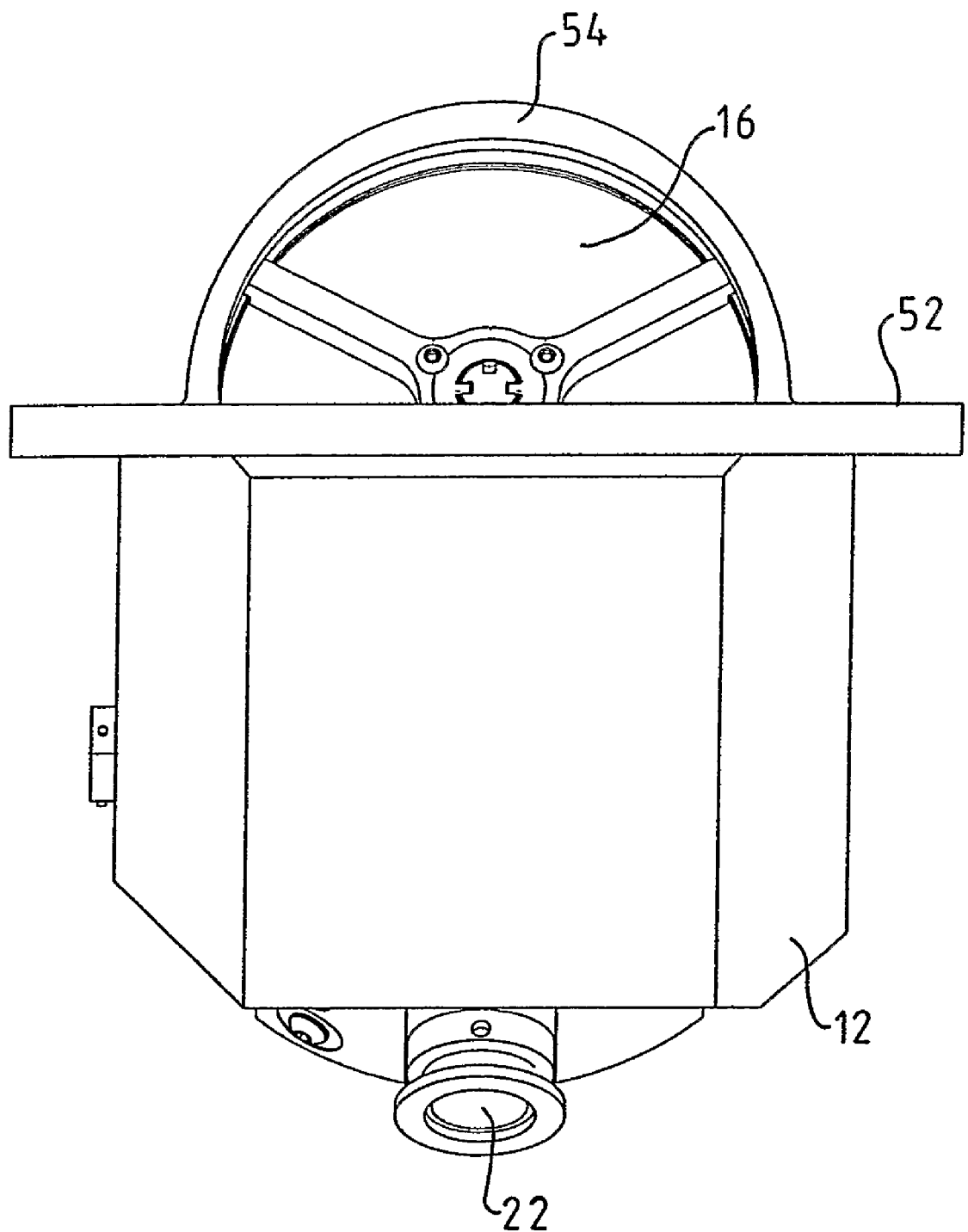
Figure 6:
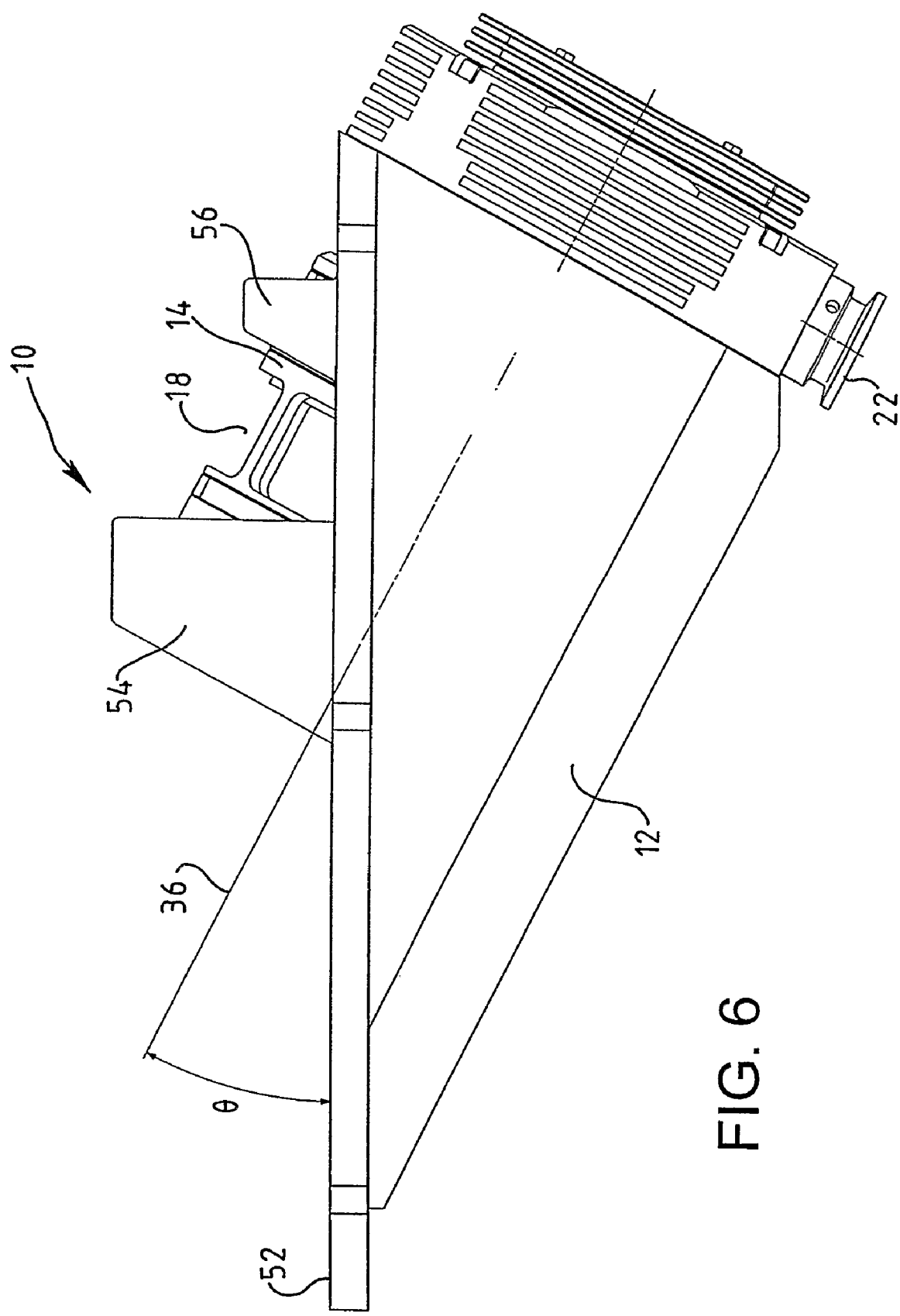

The pump 10 comprises a housing 12 having a bore for receiving a cylindrical cartridge 14 containing a pumping mechanism and a plurality of fluid inlets 16, 18, 20 and a fluid outlet 22.

With reference to FIG. 1, the cartridge 14 comprises a multi-component body 24 within which is mounted a drive shaft 26. Rotation of the shaft 26 is effected by a motor 28 positioned about the shaft 26. The shaft 26 is mounted on opposite bearings. For example, the drive shaft 26 may be supported by a hybrid permanent magnet bearing and oil lubricated bearing system.

The pumping mechanism within the cartridge includes at least three pumping sections 30, 32, 34. The first pumping section 30 comprises a set of turbo-molecular stages. In the example shown in FIG. 1, the set of turbo-molecular stages 30 comprises four rotor blades and four stator blades of known angled construction. In this example, the rotor blades of the first pumping section are integral with the drive shaft 26.

The second pumping section 32 is similar to the first pumping section 30, and also comprises a set of turbo-molecular stages. In the example shown in FIG. 1, the set of turbo-molecular stages 32 also comprises four rotor blades and four stator blades of known angled construction. In this example, the rotor blades of the first pumping section are also integral with the drive shaft 26.

Downstream of the first and second pumping sections is a third pumping section 34. The third pumping section 34 is in the form of a molecular drag mechanism, for example, a Holweck drag mechanism. In this example, the Holweck mechanism comprises two rotating cylinders and corresponding annular stators having helical channels formed therein in a manner known per se. The rotating cylinders are preferably formed from a carbon fibre material, and are mounted on a disc located on the drive shaft 26. In this example, the disc is also integral with the drive shaft 26. The pump outlet 22 is located downstream from the Holweck mechanism 34.

The cartridge 14 has three inlets 16, 18 and 20. The first, low fluid pressure inlet 16 is located upstream of all of the pumping sections. In this example, the first inlet 16 is substantially orthogonal to the longitudinal axis of the drive shaft 26, as indicated at 36. The second, middle fluid pressure inlet 18 is located interstage the first pumping section 30 and the second pumping section 32. In this example, the second inlet 18 extends about the longitudinal axis of the drive shaft 26. The third, low fluid pressure inlet 20 may be located, as illustrated, upstream of or, alternatively, between the stages of the Holweck mechanism 34, such that all of the stages of the Holweck mechanism are in fluid communication with the each of the inlets 16, 18, 20.

Returning now to the housing 12, the bore has an inlet formed in the rear surface 38 of the housing 12 and through which the cartridge 14 is inserted into the housing 12. The inner surfaces 40, 42, 44, 46 of the bore guide the cartridge 14 towards the fully inserted position shown in FIGS. 1 to 6 as it is inserted into the bore. The end of the bore is profiled as indicated at 48 in FIG. 1 to define abutment surfaces for engaging the front end of the inserted cartridge 14 and which, with the rear surface 38 of the housing 12, limit the extent to which the cartridge 14 can be inserted into the housing 12.

As shown in FIGS. 1 to 6, the housing 12 is shaped so as to expose the bore at a number of locations to allow fluid to enter the fluid inlets 16, 18, 20 when the cartridge 14 is in the fully inserted position. In the example shown, the housing 12 comprises a mouth 50 formed in a flanged planar surface 52 of the housing 12, the flanged planar surface 52 being inclined at an acute angle to the rear surface 38 of the housing, and at an acute angle $\theta$ to the longitudinal axis of the bore of the housing. The angle $\theta$ may be at any angle between 10° and 80° inclusive, preferably at an angle between 20° and 50° inclusive. In the example illustrated in the figures, $\theta=27.5°$. In the fully inserted position shown in the figures, the longitudinal axis 36 of the pumping mechanism is co-axial with the bore of the housing 12.

In order to locate the cartridge in the fully inserted position, curved members 54, 56 defining part of the bore of the housing 12 extend across the mouth 50 of the housing 12. In this example, the curved members 54, 56 are integral with the housing 12. Alternatively, the curved members 54, 56 may be separate members insertable into the housing 12. The curved inner surfaces 44, 46 of the curved members 54, 56, which form part of the bore of the housing 12, form a seal with the body 24 of the cartridge 14 whilst allowing each of the inlets 16, 18, 20 to be partially exposed by the mouth 50 formed in the flanged planar surface 52 of the housing 12. As shown in the figures, part of the first inlet 16 and part of the second inlet 18 project through the mouth 50 of the housing 12, whilst the third inlet 20 is located just beneath the mouth 50.

Figure 7:
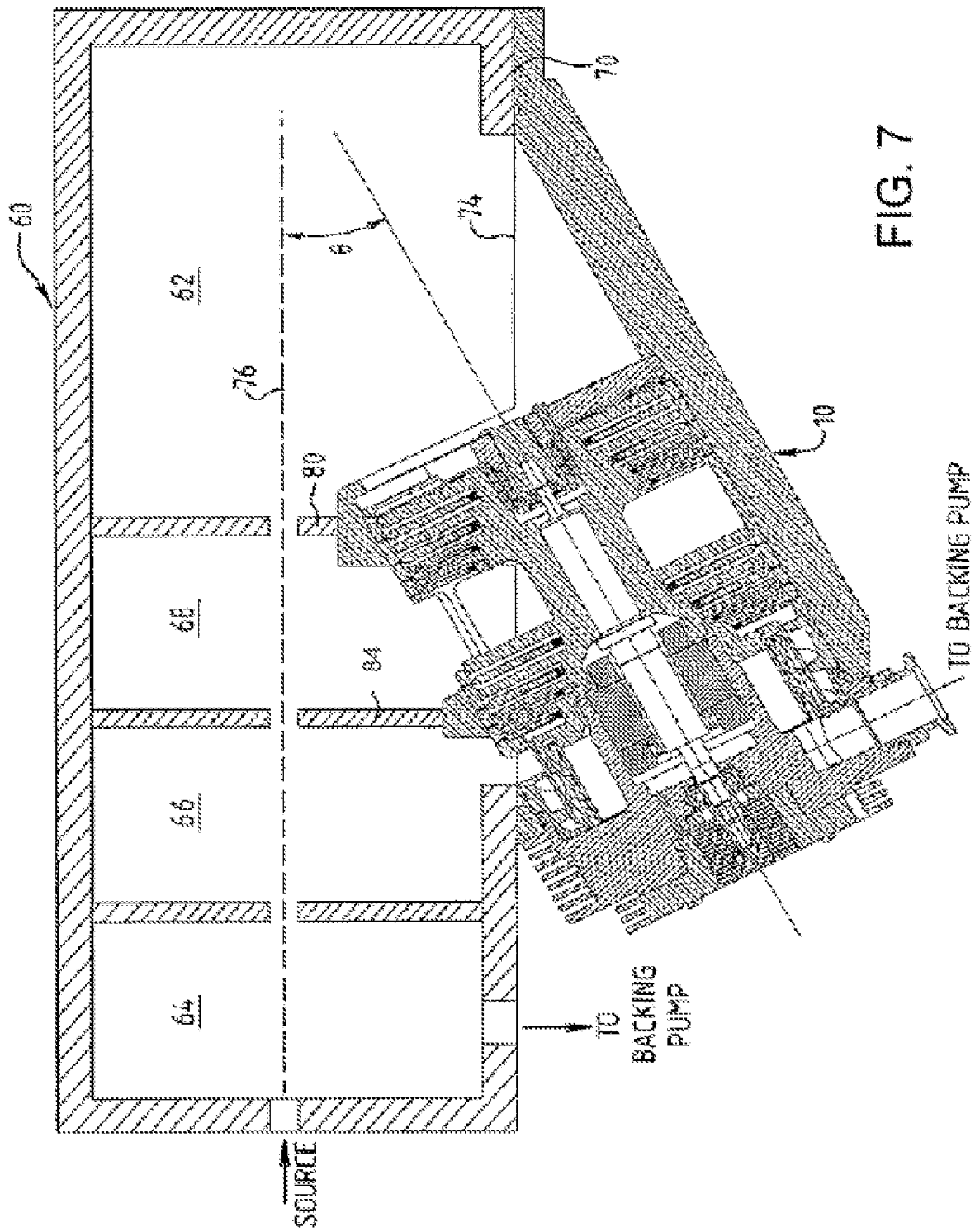
FIG. 7 is a simplified cross-section illustrating the connection of the assembly to a multi-chambered system.

FIG. 7 shows the pump 10 attached to an example of a multi-chamber system 60 to be evacuated using the pump 10. In the example shown, the multi-chamber system 60 is a mass spectrometer system. A high vacuum chamber 62 immediately follows first, (depending on the type of system) second, and third evacuated interface chambers 64, 66, 68. The first interface chamber 64 is the highest-pressure chamber in the evacuated spectrometer system and may contain a capillary or sample cone through which ions are drawn from an ion source into the first interface chamber 64. The second, interface chamber 66 may include a first ion guide for guiding ions from the first interface chamber 64 into the third interface chamber 68, and the third chamber 68 may include a second ion guide for guiding ions from the second interface chamber into the high vacuum chamber 62.

The flanged planar surface 52 of the pump 10 is attached to the planar, bottom surface 70 of the system 60, for example by means of bolts or the like. An O-ring located within a groove 72 assists in forming a seal between the surfaces 52 and 70. As shown in FIG. 7, with the pump 10 attached to the system 60, the cartridge 14 protrudes into the system 60 through an opening 74 formed in the bottom surface 70 of the system such that the first inlet 16 of the cartridge 14 and the first pumping section 30 protrude into the high vacuum chamber 62, and the second inlet 18 of the cartridge 14 and the second pumping section 32 protrude into the third chamber 68, and such that the pump 10 is inclined at angle $\theta$ to the path 76 of ions conveyed within the system 60 during use to maximise conductance at the inlets of the pump. The extent to which the pump 10 extends into the system 60 is not so great, however, as to cause the pump to cross the ion path 76. To prevent fluid leakage between the chambers of the system 60 during use, the upper surface 78 of the cross member 54 sealingly engages a conformingly-profiled lower surface of the dividing wall 80 between the high vacuum chamber 60 and the third chamber 68, and the upper surface 82 of the cross member 56 sealingly engages a conformingly-profiled lower surface of the dividing wall 84 between the second chamber 66 and the third chamber 68.

In use, the first interface chamber 64 is connected to a backing pump (not shown), which also pumps fluid from the outlet 22 of the pump 10. The backing pump typically creates a pressure within the first chamber of roughly the same order of magnitude as that at the outlet 22 of the pump 10. Fluid entering each inlet 16, 18, 20 of the pump 10 passes through a respective different number of stages before exiting from the pump. Fluid pumped through the first inlet 16 passes through both sets 30, 32 of turbo-molecular stages in sequence and the Holweck mechanism 34 and exits the pump via outlet 22. Fluid pumped through the second inlet 18 passes through set 32 of turbo-molecular stages and the Holweck mechanism 34 and exits the pump via outlet 22. Fluid pumped through the third inlet 20 passes through the Holweck mechanism 34 only and exits the pump via outlet 30. Consequently, the pump 10 is able to provide the required vacuum levels in the chambers 62, 66, 68, with the backing pump providing the required vacuum level in the chamber 64. In this example, in use the first interface chamber 64 is at a pressure of around 1-10 mbar, the second interface chamber 66 is at a pressure of around $10^{-1}$-1 mbar, the third interface chamber 68 is at a pressure of around $10^{-2}$-$10^{-3}$ mbar, and the high vacuum chamber 60 is at a pressure of around $1.0^{-5}$-$10^{-6}$ mbar.

While the foregoing description and drawings represent the preferred embodiments of the present invention, it will be apparent to those skilled in the art that various changes and modifications may be made therein without departing from the true spirit and scope of the present invention.

We claim:

1. A system comprising a plurality of pressure chambers and a vacuum pump for differentially evacuating the chambers, the pump comprising:
   a plurality of inlets each for receiving fluid from a respective pressure chamber;
   a pumping mechanism for differentially pumping fluid from the chambers, wherein the pump protrudes through an opening into the chambers such that at least one of the fluid inlets is at least partially located within its respective pressure chamber, and the longitudinal axis of the pump is inclined to the plane of the mouth of the opening; and
   a housing having a bore for receiving the pumping mechanism, a flanged surface attachable to the pressure chambers, and a curved member extending beyond a plane of the flanged surface, without crossing a fluid path through the pressure chambers.

2. The system according to claim 1 wherein each of the fluid inlets is at least partially located within its respective pressure chamber.

3. The system according to claim 1 wherein the axis of the pump is inclined at an angle between 10 and 80 degrees.

4. The system according to claim 3 wherein the axis of the pump is inclined at an angle between 20 and 50 degrees.

5. The system according to claim 1 wherein the pump is in the form of a cartridge inserted into the bore configured to expose the fluid inlets of the cartridge.

6. The system according to claim 5 wherein the bore protrudes into the chambers through the opening, and wherein the longitudinal axis of the bore is inclined to the plane of the mouth of the opening.

7. The system according to claim 1 wherein the housing is attachable to a surface defining the mouth of the opening.

8. The system according to claim 1 wherein the housing comprises means for locating the cartridge within the bore.

9. The system according to claim 8 wherein the location means is arranged to form a seal with the outer surface of the cartridge.

10. The system according to claim 8 wherein the location means restricts the extent to which the cartridge can be inserted into the bore.

11. The system according to claim 1 wherein the pumping mechanism comprises a first pumping section and a second pumping section downstream from the first pumping section, the sections being arranged such that fluid entering the cartridge through a first inlet passes through the first and second pumping sections towards a fluid outlet, and fluid entering the cartridge through a second inlet passes through only the second section towards the outlet.

12. The system according to claim 11 wherein the first inlet is substantially orthogonal to the longitudinal axis of the pump.

13. The system according to claim 11 wherein the second inlet extends about the longitudinal axis of the pump.

14. The system according to claim 11 wherein at least one of the first and the second pumping sections protrudes into a respective pressure chamber.

15. The system according to claim 11 wherein at least one of the first and second pumping sections comprises at least one turbo-molecular stage.

16. The system according to claim 11 wherein both of the first and second pumping sections comprise at least one turbo-molecular stage.

17. The system according to claim 11 wherein the cartridge comprises a third inlet and the pumping mechanism comprises a third pumping section downstream from the second pumping section, the third pumping section being arranged such that fluid entering the cartridge through the third inlet passes through only the third pumping section towards the pump outlet.

18. The system according to claim 17 wherein the third pumping section comprises a multi-stage molecular drag mechanism.

19. The system according to claim 18 wherein the molecular drag mechanism is a multi-stage Holweck mechanism with a plurality of channels arranged as a plurality of helixes.

20. A differentially pumped mass spectrometer system comprising:
   a mass spectrometer having a plurality of pressure chambers through which during use ions are conveyed along a path;
   a pump for differentially evacuating the chambers, the pump comprising a plurality of inlets each for receiving fluid from a respective pressure chamber and a pumping mechanism for differentially pumping fluid from the chambers, and wherein the pump is inclined relative to at least part of the ion path and protrudes into the spectrometer without crossing the ion path and wherein at least one of the fluid inlets is partially located within its respective pressure chamber; and
   a housing having a bore for receiving the pump, a flanged surface attachable to the pressure chambers, and a curved member extending beyond a plane of the flanged surface, without crossing the ion path.

21. A vacuum pump comprising a housing, a cartridge insertable into the housing, the cartridge comprising a fluid inlet and a pumping mechanism, and means for locating the cartridge within the housing such that a part of the cartridge defining the fluid inlet protrudes from a mouth of the housing, and the longitudinal axis of the pumping mechanism is inclined relative to the plane of the mouth, wherein the housing has a curved member extending beyond a plane of the mouth.

22. The pump according to claim 21 wherein the location means are arranged to locate the cartridge within the housing such that the pumping mechanism is inclined at an angle between 10 and 80 degrees.

23. The pump according to claim 21 wherein the location means are arranged to form a seal with the outer surface of the cartridge.

24. The pump according to claim 21 wherein the location means comprises means for engaging the cartridge to restrict the extent to which the cartridge can protrude from the mouth of the housing.

25. The pump according to claim 21 wherein the location means comprises at least one curved member extending across the mouth of the housing.

26. The pump according to claim 21 wherein the mouth is located in a flanged surface of the housing.

27. The pump according to claim 26 wherein the flanged surface comprises means for attaching the housing to a system to be evacuated using the pump.

28. The pump according to claim 21 wherein the cartridge comprises a plurality of fluid inlets, the pumping mechanism comprising a plurality of pumping sections for differentially pumping fluid received through the inlets.

29. The pump according to claim 21 wherein the location means are arranged to locate the cartridge within the housing such that the pumping mechanism is inclined at an angle between 20 and 50 degrees.

* * * * *